(12) United States Patent
Kuo et al.

(10) Patent No.: US 9,068,573 B2
(45) Date of Patent: Jun. 30, 2015

(54) CENTRIFUGAL FAN

(75) Inventors: Jung-Hun Kuo, New Taipei (TW);
Mei-Hui Lai, New Taipei (TW);
Yi-Hsieh Chiou, New Taipei (TW)

(73) Assignee: Wistron Corporation, New Taipei (TW)

( * ) Notice: Subject to any disclaimer, the term of this patent is extended or adjusted under 35 U.S.C. 154(b) by 494 days.

(21) Appl. No.: 13/552,846

(22) Filed: Jul. 19, 2012

(65) Prior Publication Data

US 2013/0243584 A1 Sep. 19, 2013

(30) Foreign Application Priority Data

Mar. 19, 2012 (TW) .............................. 101109274 A

(51) Int. Cl.
| | |
|---|---|
| F04D 25/06 | (2006.01) |
| F04D 29/66 | (2006.01) |
| F04D 29/42 | (2006.01) |
| G06F 1/20 | (2006.01) |
| F04D 27/00 | (2006.01) |
| G06F 1/16 | (2006.01) |

(52) U.S. Cl.
CPC .......... *F04D 27/002* (2013.01); *F05D 2250/90* (2013.01); *F05D 2270/303* (2013.01); *F04D 25/0613* (2013.01); *F04D 29/422* (2013.01); *F04D 29/667* (2013.01); *G06F 1/1656* (2013.01); *G06F 1/203* (2013.01)

(58) Field of Classification Search
CPC ............ F04D 15/0027; F04D 25/0613; F04D 27/002; F04D 29/4206; F04D 29/442; F04D 29/464; F04D 29/667; F05D 2250/90; F05D 2270/303
See application file for complete search history.

(56) References Cited

U.S. PATENT DOCUMENTS

| 2,649,242 | A | * | 8/1953 | Payne .......................... 415/52.1 |
| 6,319,112 | B2 | * | 11/2001 | Komowski .................... 454/139 |
| 8,197,193 | B2 | * | 6/2012 | Messmer ...................... 415/126 |
| 8,206,099 | B2 | * | 6/2012 | Tsai et al. ...................... 415/206 |
| 8,602,723 | B2 | * | 12/2013 | Chou et al. .................... 415/126 |
| 8,662,832 | B2 | | 3/2014 | Tsai et al. |
| 2004/0165984 | A1 | * | 8/2004 | Ochiai et al. .................. 415/206 |
| 2010/0275560 | A1 | | 11/2010 | Chen et al. |
| 2011/0083832 | A1 | * | 4/2011 | Chou et al. .................... 165/121 |
| 2013/0243584 | A1 | * | 9/2013 | Kuo et al. ..................... 415/203 |

FOREIGN PATENT DOCUMENTS

| CN | 2690633 | Y | 4/2005 |
| CN | 101294581 | A | 10/2008 |
| CN | 101511158 | A | 8/2009 |
| CN | 101649842 | A | 2/2010 |

(Continued)

*Primary Examiner* — Edward Look
*Assistant Examiner* — Christopher R Legendre
(74) *Attorney, Agent, or Firm* — Muncy, Geissler, Olds & Lowe, P.C.

(57) ABSTRACT

A centrifugal fan is disclosed. The centrifugal fan includes a fan device and a case. The fan device includes an impeller and a plurality of blades, wherein the plurality of blades are mounted separately around the impeller. The case is provided to allow the fan device to be disposed and to rotate inside it. The case includes a top cover, a bottom cover, and a side wall. The side wall is mounted between the top cover and the bottom cover. The side wall includes a fixed part and a deformable part. The fixed part is connected with the top cover and the bottom cover, and the deformable part is connected with the fixed part.

9 Claims, 4 Drawing Sheets

(56) References Cited

FOREIGN PATENT DOCUMENTS

| | | | |
|---|---|---|---|
| CN | 201407208 Y | | 2/2010 |
| JP | 61036634 A | * | 2/1986 |
| JP | 61190197 A | * | 8/1986 |
| JP | 62282200 A | * | 12/1987 |
| JP | 2002089494 A | * | 3/2002 |
| JP | 2002193934 A | * | 7/2002 |
| TW | M366611 U1 | | 10/2009 |
| TW | I327192 | | 7/2010 |
| TW | I347826 | | 8/2011 |

* cited by examiner

CENTRIFUGAL FAN

BACKGROUND OF THE INVENTION

1. Field of the Invention

The present invention relates to a centrifugal fan; more particularly, the present invention relates to a centrifugal fan capable of adjusting a gap size between part of a side wall and the blades.

2. Description of the Related Art

Conventionally, fans applied in computer equipment mainly comprise two types: one is an axial fan, and the other is a centrifugal fan. The major difference between the above two types of fans is the direction of outlet airflow. The outlet airflow direction of the axial fan is perpendicular to the direction of the blades, while the outlet airflow direction of the centrifugal fan is along the rotary direction of its blades. Because of the limited available space in laptop computers, most of the fans currently installed in laptop computers are centrifugal fans.

Generally speaking, a good centrifugal fan should have a high heat dissipation watts and good heat dissipation efficiency along with advantages such as low noise. Many factors, such as motor bearing selection and fan rotation speeds, can affect the generation of fan noise. It was experimentally demonstrated in 1969 that the level of the generated noise is related to the size of the gap between a tongue part and an impeller of the centrifugal fan. The experiment demonstrated that if the gap between the tongue part and the impeller is enlarged by expanding the case of a fan, narrow-band and broad-band noises can be significantly reduced.

However, enlarging the gap between the tongue part and the impeller decreases the outlet airflow of the centrifugal fan, which can result in overheating of the system due to insufficient airflow when a central processing unit or other elements of the computer are running in a high-loading operating environment. Therefore, it is important to consider both the outlet airflow of the centrifugal fan and the level of noise generated.

SUMMARY OF THE INVENTION

It is an object of the present invention to provide a centrifugal fan capable of adjusting gap sizes between each part of a side wall and each of a plurality of blades and an electronic device having the centrifugal fan.

To achieve the abovementioned objects, the centrifugal fan of the present invention can be used in an electronic device. The centrifugal fan includes a fan device and a case. The fan device includes an impeller and a plurality of blades, wherein the plurality of blades is mounted apart around the impeller and is connected with the impeller. The case is provided to allow the fan device to be disposed and rotate therein. The case includes a top cover, a bottom cover, and a side wall. The top cover includes an air inlet. The bottom cover is parallel to the top cover, and the fan device is disposed between the top cover and the bottom cover. The side wall is mounted between the top cover and the bottom cover, and the sizes of the gaps between each part of the side wall and the nearby blade are different, such that air entering the air inlet flows toward a direction of an air outlet and through the air outlet. The side wall includes a fixed part and a deformable part. The fixed part is connected with the top cover and the bottom cover. The deformable part is connected with the fixed part. Therefore, when the fan device rotates inside the case to make the air enter the air inlet, the deformation of the deformable part causes adjustment of a gap width between the side wall and the plurality of blades, thereby adjusting an airflow of the air through the air outlet.

According to one embodiment of the present invention, the deformable part of the present invention is made of elastic materials, and the centrifugal fan further includes a control bar and a fixing element, wherein the control bar is used for making the deformable part cause deformation, and the fixing element is connected with the control bar for fixing the control bar.

According to another embodiment of the present invention, the deformable part of the present invention is made of memory alloy materials.

The electronic device of the present invention includes the abovementioned centrifugal fan.

Other objects, advantages, and novel features of the invention will become apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

Figure 1:
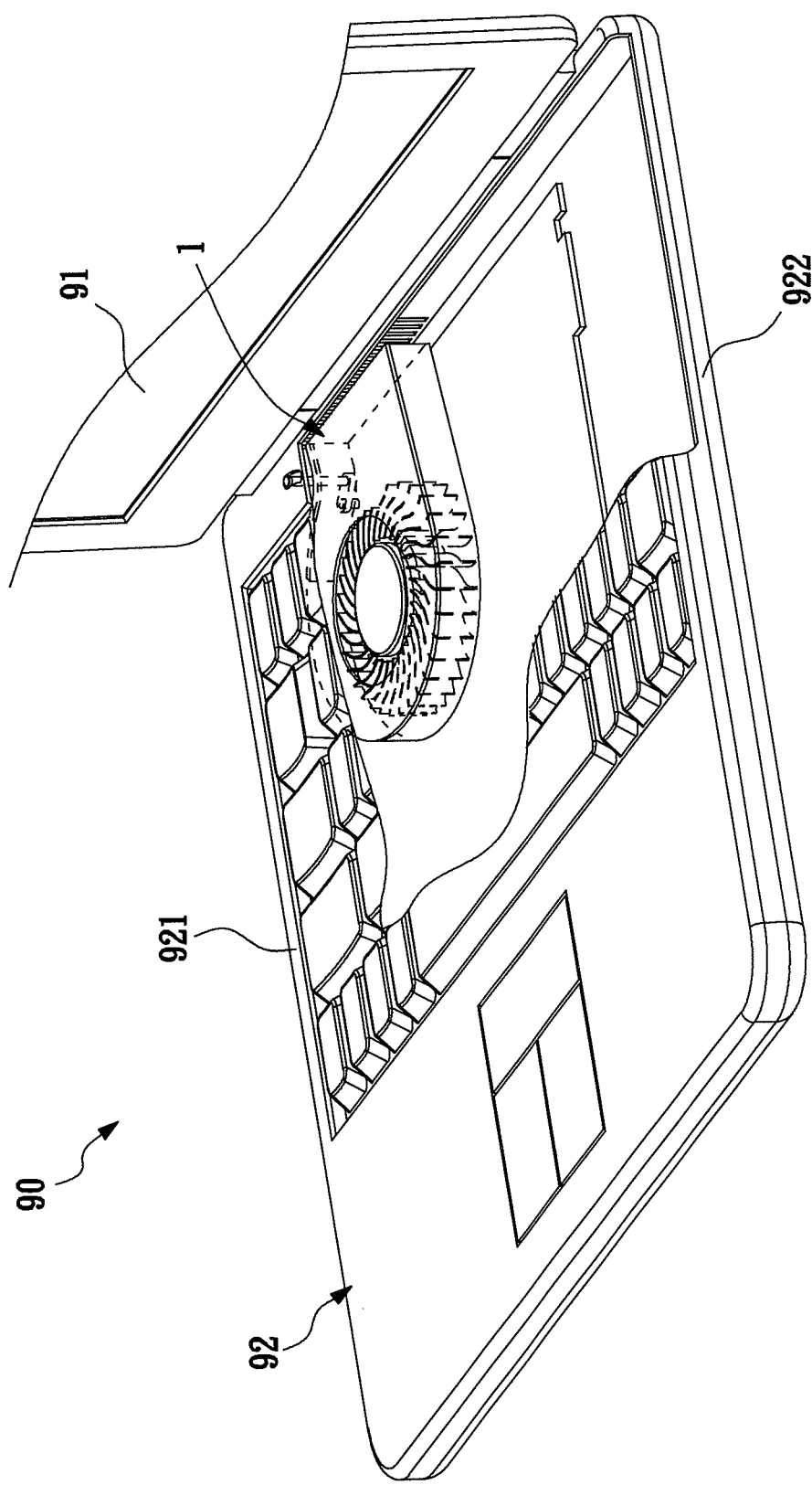
FIG. 1 illustrates a schematic drawing of a centrifugal fan installed in an electronic device according to the present invention.
Figure 2:
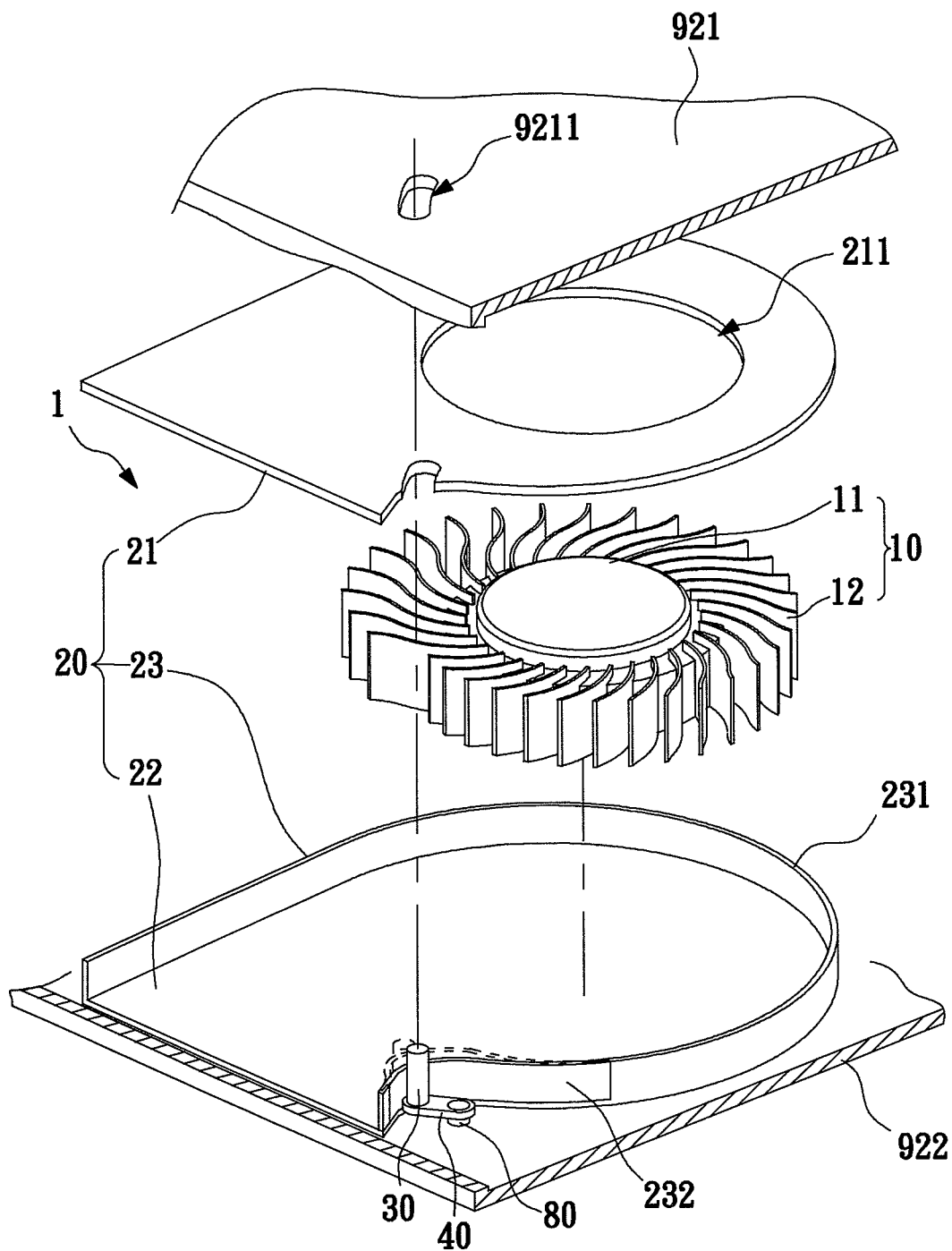
FIG. 2 illustrates an exploded view of the centrifugal fan according to a first embodiment of the present invention.
Figure 3:
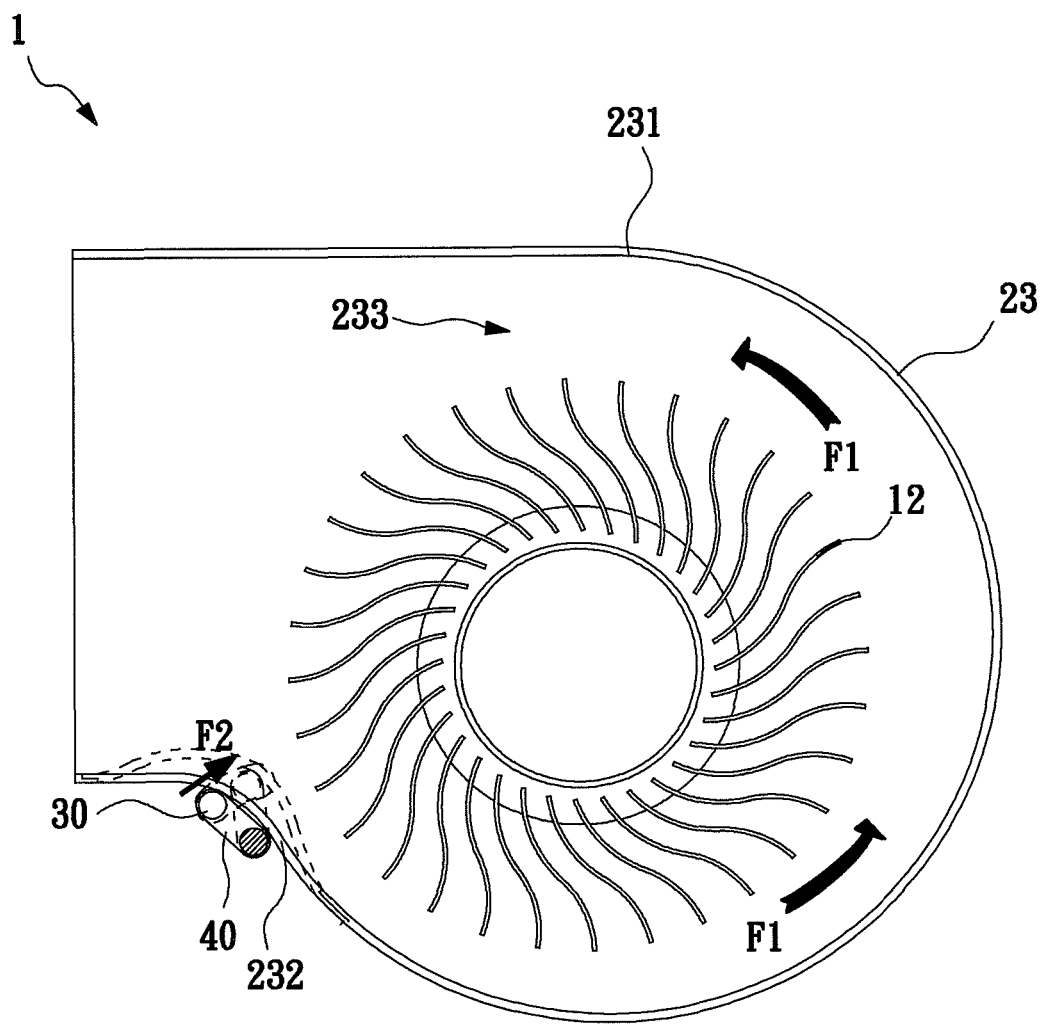
FIG. 3 illustrates an operational schematic drawing of the centrifugal fan according to the first embodiment of the present invention.

Please refer to FIG. 1-3, wherein FIG. 1 illustrates a schematic drawing of a centrifugal fan installed in an electronic device according to the present invention; FIG. 2 illustrates an exploded view of the centrifugal fan according to a first embodiment of the present invention; and FIG. 3 illustrates an operational schematic drawing of the centrifugal fan according to the first embodiment of the present invention.

As shown in FIG. 1 and FIG. 2, in one embodiment of the present invention, the centrifugal fan 1 of the present invention can be applied in an electronic device 90. The electronic device 90 comprises a display monitor 91 and a base 92, wherein the base 92 includes an upper cover 921 and a lower cover 922, and the upper cover 921 comprises a through hole 9211. The centrifugal fan 1 is disposed between the upper cover 921 and the lower cover 922. In one embodiment of the present invention, the electronic device 90 of the present invention is, but is not limited to, a laptop computer.

In the first embodiment of the present invention, the centrifugal fan 1 of the present invention comprises a fan device 10, a case 20, a control bar 30, and a fixing element 40.

The fan device 10 includes an impeller 11 and a plurality of blades 12, wherein the plurality of blades 12 is mounted apart around the impeller 11 and is connected with the impeller 11.

The case 20 is provided to allow the fan device 10 to be disposed and rotate therein. The case 20 includes a top cover 21, a bottom cover 22, and a side wall 23. The top cover 21 comprises an air inlet 211. The bottom cover 22 is parallel to the top cover 21, and the fan device 10 is disposed between the top cover 21 and the bottom cover 22. The side wall 23 is mounted between the top cover 21 and the bottom cover 22, and the sizes of the gaps between each part of the side wall 23 and the nearby blade 12 are different. As shown in FIG. 3, in the embodiment of the present invention, the gap sizes between each part of the side wall 23 and of the nearby blade 12 increase along a counterclockwise direction, such that air entering the air inlet 211 can flow along the counterclockwise direction (i.e., the arrow F1 shown in FIG. 3) and through the air outlet 233. Because the theory of the abovementioned airflow formation after air enters the centrifugal fan is commonly known by those skilled in the art, and it is not the main concept of the present invention, and because the theory of airflow formation is also presented in many patent publications and research papers, there is no need for further description.

As shown in FIG. 2, the side wall 23 of the case 20 of the centrifugal fan 1 of the present invention comprises a fixed part 231 and a deformable part 232. The fixed part 231 is connected with the top cover 21 and the bottom cover 22, and the deformable part 232 is connected with the fixed part 231. In the first embodiment of the present invention, the deformable part 232 is made of elastic materials. In one embodiment of the present invention, the elastic material for making the deformable part 232 is, but is not limited to, thermoplastic polyurethane (TPU).

The control bar 30 is disposed in the vicinity of the deformable part 232 and is used for pushing against the deformable part 232 to cause deformation of the deformable part 232. One end of the control bar 30 passes through the through hole 9211 of the upper cover 921 so as to be located above the upper cover 921, such that a user can move the control bar 30 to change the position of the control bar 30.

The fixing element 40 is connected with the lower cover 922 via a screw 80, and the fixing element 40 can rotate relative to the lower cover 922. The other end of the control bar 30 is connected with the fixing element 40 such that the fixing element 40 can support and fasten the control bar 30 in order that the fixing element 40 can be rotated by means of moving the control bar 30.

As shown in FIG. 1 and FIG. 3, a wider gap between the side wall 23 and the blades 12 corresponds to less airflow being driven by the blades 12 and a corresponding reduction of the airflow through the air outlet 233. Because the airflow is low, the noise generated due to operation can be relatively reduced. In contrast, a narrower gap between the side wall 23 and the blades 12 corresponds to more airflow being driven by the blades 12 and a corresponding increase in the airflow through the air outlet 233 that causes a relative increase in the noise. As a result, if the electronic device 90 is running under a normal low-loading operating environment, the system heat dissipation requirement is low, such that the gap widths between the side wall 23 and the blades 12 can be wider to reduce the noise. In contrast, if the electronic device 90 is running under a high-loading operating environment, the user can move the control bar 30 to make the control bar 30 push inwards (i.e. the arrow F2 shown in FIG. 3) against the deformable part 232 of the side wall 23 so as to narrow the gap widths between parts of the deformable part 232 and parts of the blades 12, thereby increasing the airflow through the air outlet 233 so that the electronic device 90 can maintain sufficient heat dissipation airflow, even while running under the high-loading operating environment, to maintain the system temperature and prevent overheating.

Figure 4:
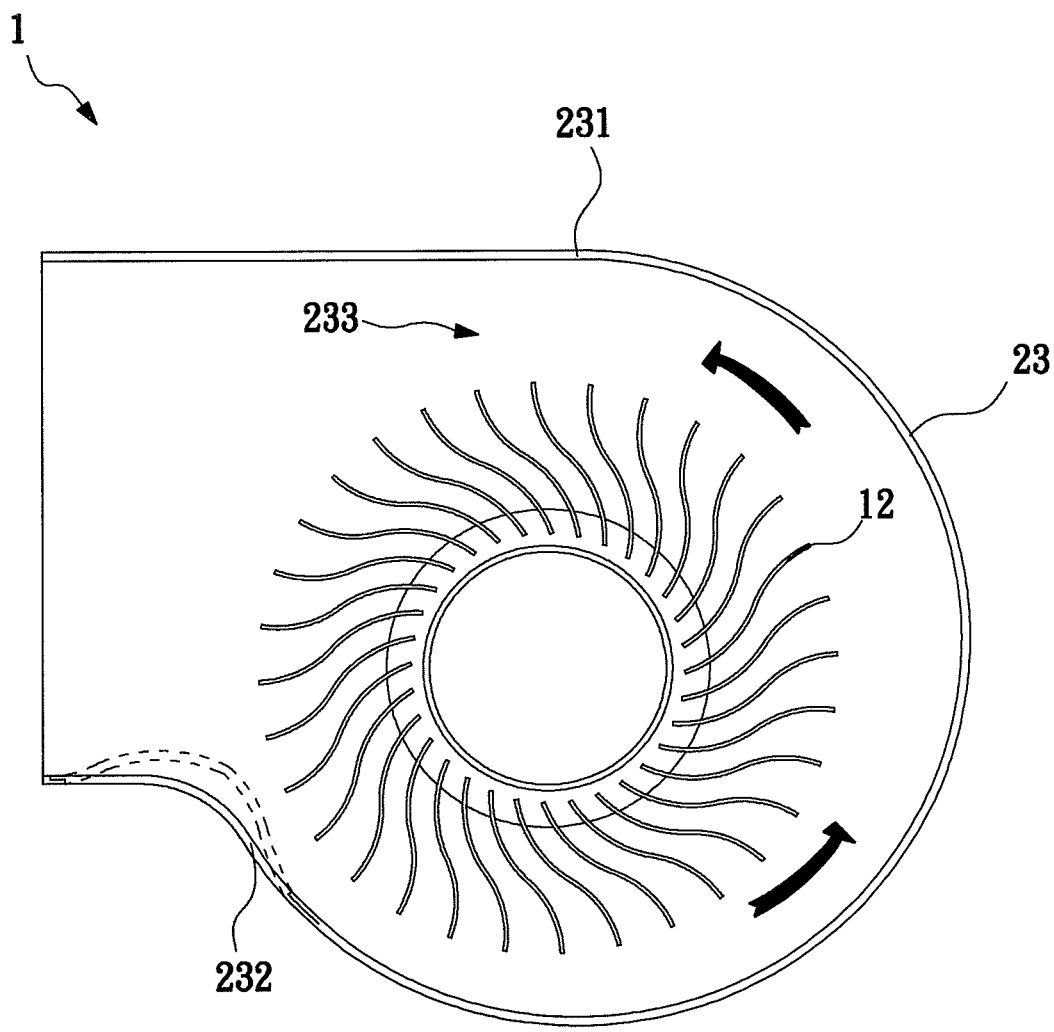
FIG. 4 illustrates a schematic drawing of the centrifugal fan according to a second embodiment of the present invention.

Please continue to refer to FIG. 1, and also refer to FIG. 4, which illustrates a schematic drawing of the centrifugal fan according to a second embodiment of the present invention.

As shown in FIG. 4, in the second embodiment of the present invention, the deformable part 232 is made of memory alloy materials. Because an alloy with memory effect would cause deformation over (or under) a certain temperature, the temperature difference generated when the electronic device 90 runs under different operating states can cause deformation of a deformable part 232 made of the memory alloy so as to adjust the gap widths between the deformable part 232 and the blades 12. In the second embodiment of the present invention, the memory alloy used for making the deformable part 232 is an alloy consisting of 50% nickel and 50% titanium. However, the composition of the memory alloy is not limited to the above example; any kind of alloy having a memory effect, such as nickel-aluminum alloy or copper-zinc alloy, is applicable for making the deformable part 232 of the present invention. The selection of the memory alloy can be determined according to the range of variation of the system temperature. For example, if the memory alloy consists of 50% nickel and 50% titanium, the temperature for remembering and causing deformation is around 40 degrees Celsius. Therefore, if the internal temperature of the electronic device 90 running in a low-loading state is lower than 40° C., and the internal temperature of the electronic device 90 running in a high-loading state is higher than 40° C., then the nickel-titanium alloy is applicable for making the deformable part 232 of the present invention.

As shown in FIG. 4, when the electronic device 90 is running in the low-loading state, the gap widths between the deformable part 232 and the blades 12 are predetermined in a wider state so as to reduce the noise generated during the fan operation. Once the electronic device 90 starts to run high-loading operations (such as executing multiple programs at the same time), the internal temperature of the electronic device 90 will gradually rise, and when the internal temperature exceeds 40° C., the deformable part 232 made of the nickel-titanium alloy consisting of 50% nickel and 50% titanium will automatically cause inwardly-indented deformation (as shown by the dotted line in FIG. 4) due to heat so as to narrow the gap widths between the deformable part 232 and the blades 12, thereby achieving the same object as the first embodiment does. Because the deformation of memory alloy materials at different temperatures is commonly known to and understood by those skilled in the art, there is no need for further description.

Unlike the known prior arts, the centrifugal fan 1 of the present invention includes a side wall 23 with a deformable part 232. Therefore, the position of the deformable part 232 of the electronic device 90 can be adjusted in different operating states so as to change the gap widths between the side wall 23 and the blades 12, thereby adjusting the airflow and the generated noise of the fan, such that both the airflow requirement and the noise problem can be adjusted to meet different operation needs.

Please note that the above embodiments are preferred embodiments of the present invention and are not intended to limit the scope of the present invention. It is to be understood by those skilled in the art that the abovementioned elements are not all essential elements. Furthermore, in order to implement the present invention, other detailed known elements (such as a motor device for driving the fan device 10 to rotate) might be included as well. Each element can be omitted or modified according to different needs. For example, one end of the control bar 30 can be directly connected with the top of the deformable part 232, and the other end of the control bar 30 can protrude from the through hole 9211 for the user to manipulate. If that is the case, then the fixing element 40 can be omitted.

Although the present invention has been explained in relation to its preferred embodiments, it is to be understood that many other possible modifications and variations can be made without departing from the spirit and scope of the invention as hereinafter claimed.

What is claimed is:

1. An electronic device, comprising a centrifugal fan, the centrifugal fan comprising:
a fan device, comprising:
an impeller; and
a plurality of blades, mounted separately around the impeller, and connected with the impeller; and
a case, provided to allow the fan device to be disposed and rotate therein, the case comprising:
a top cover, comprising an air inlet;
a bottom cover, parallel to the top cover, wherein the fan device is disposed between the top cover and the bottom cover; and
a side wall, mounted between the top cover and the bottom cover, wherein gap sizes between each part of the side wall and of the nearby blades are different, such that air entering the air inlet flows toward a direction of an air outlet and through the air outlet, the side wall comprising:
a fixed part, connected with the top cover and the bottom cover; and
a deformable part, connected with the fixed part, such that when the fan device rotates inside the case to make the air enter the air inlet, deformation of the deformable part causes adjustment of a gap width between the deformable part of the side wall and the nearby blades, thereby adjusting an airflow of the air through the air outlet;
wherein the deformable part is made of memory alloy materials.

2. The electronic device as claimed in claim 1, wherein the deformable part is made of nickel-titanium alloy.

3. An electronic device, comprising a centrifugal fan, the centrifugal fan comprising:
a fan device, comprising:
an impeller; and
a plurality of blades, mounted separately around the impeller, and connected with the impeller; and
a case, provided to allow the fan device to be disposed and rotate therein, the case comprising:
a top cover, comprising an air inlet;
a bottom cover, parallel to the top cover, wherein the fan device is disposed between the top cover and the bottom cover; and
a side wall, mounted between the top cover and the bottom cover, wherein gap sizes between each part of the side wall and of the nearby blades are different, such that air entering the air inlet flows toward a direction of an air outlet and through the air outlet, the side wall comprising:
a fixed part, connected with the top cover and the bottom cover; and
a deformable part, connected with the fixed part, such that when the fan device rotates inside the case to make the air enter the air inlet, deformation of the deformable part causes adjustment of a gap width between the deformable part of the side wall and the nearby blades, thereby adjusting an airflow of the air through the air outlet;
wherein the deformable part is made of elastic materials, and the centrifugal fan further comprises a control bar, such that the control bar can be moved to cause deformation of the deformable part.

4. The electronic device as claimed in claim 3, wherein the centrifugal fan further comprises a fixing element, wherein the fixing element is connected with the control bar for fixing the control bar.

5. The electronic device as claimed in claim 4 further comprising a base; the base comprises an upper cover and a lower cover, and the centrifugal fan is mounted between the upper cover and the lower cover, wherein the upper cover comprises a through hole, and at least a part of the control bar passes through the through hole to protrude from the upper cover.

6. A centrifugal fan, used in an electronic device, the centrifugal fan comprising:
a fan device, comprising:
an impeller; and
a plurality of blades, mounted separately around the impeller, and connected with the impeller; and
a case, provided to allow the fan device to be disposed and rotate therein, the case comprising:
a top cover, comprising an air inlet;
a bottom cover, parallel to the top cover, wherein the fan device is disposed between the top cover and the bottom cover; and
a side wall, mounted between the top cover and the bottom cover, wherein gap sizes between each part of the side wall and of the nearby blade are different, such that air entering the air inlet flows toward a direction of an air outlet and through the air outlet, the side wall comprising:
a fixed part, connected with the top cover and the bottom cover; and
a deformable part, connected with the fixed part, such that when the fan device rotates inside the case to make the air enter the air inlet, deformation of the deformable part causes adjustment of a gap width between the deformable part of the side wall and the nearby blades, thereby adjusting an airflow of the air through the air outlet;
wherein the deformable part is made of elastic materials, and the centrifugal fan further comprises a control bar, such that the control bar can be moved to cause deformation of the deformable part.

7. The centrifugal fan as claimed in claim 6, further comprising a fixing element, wherein the fixing element is connected with the control bar for fixing the control bar.

8. A centrifugal fan, used in an electronic device, the centrifugal fan comprising:
a fan device, comprising:
an impeller; and
a plurality of blades, mounted separately around the impeller, and connected with the impeller; and
a case, provided to allow the fan device to be disposed and rotate therein, the case comprising:
a top cover, comprising an air inlet;
a bottom cover, parallel to the top cover, wherein the fan device is disposed between the top cover and the bottom cover; and
a side wall, mounted between the top cover and the bottom cover, wherein gap sizes between each part of the side wall and of the nearby blade are different, such that air entering the air inlet flows toward a direction of an air outlet and through the air outlet, the side wall comprising:
  a fixed part, connected with the top cover and the bottom cover; and
  a deformable part, connected with the fixed part, such that when the fan device rotates inside the case to make the air enter the air inlet, deformation of the deformable part causes adjustment of a gap width between the deformable part of the side wall and the nearby blades, thereby adjusting an airflow of the air through the air outlet;
wherein the deformable part is made of memory alloy materials.

9. The centrifugal fan as claimed in claim 8, wherein the deformable part is made of nickel-titanium alloy.

* * * * *